(No Model.)
E. W. VOGEL.
UNIVERSAL JOINT.
No. 277,176. Patented May 8, 1883.
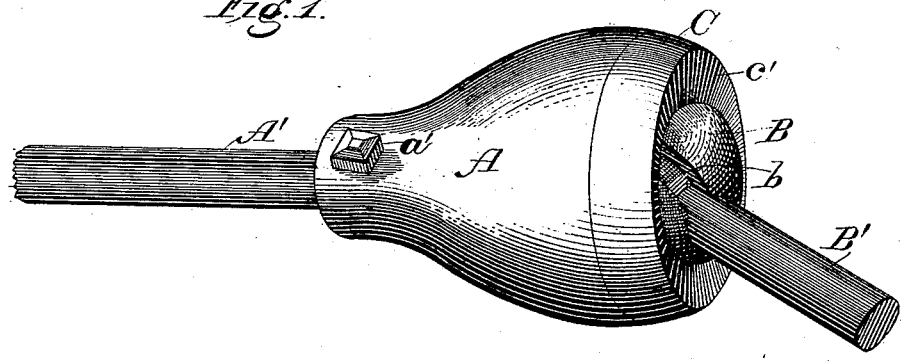
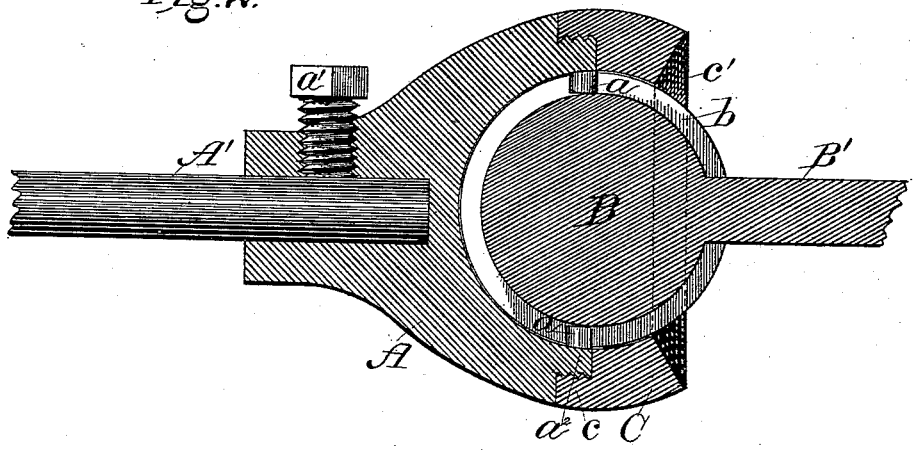

UNITED STATES PATENT OFFICE.

ERNST W. VOGEL, OF MILWAUKEE, WISCONSIN.

UNIVERSAL JOINT.

SPECIFICATION forming part of Letters Patent No. 277,176, dated May 8, 1883.

Application filed March 27, 1883. (No model.)

*To all whom it may concern:*

Be it known that I, ERNST W. VOGEL, of Milwaukee, in the county of Milwaukee, and in the State of Wisconsin, have invented certain new and useful Improvements in Universal Joints; and I do hereby declare that the following is a full, clear, and exact description thereof.

My invention relates to ball-and-socket joints; and it consists in certain peculiarities of construction, as will be more fully set forth hereinafter.

In the drawings, Figure 1 is a perspective view of my entire device, and Fig. 2 is a vertical longitudinal section of the same.

A represents the socket, which may be connected to a shaft, A', by a screw-bolt, a', as shown, or cast solidly therewith, or attached in any desired manner, and which has two interior projecting pins or lugs, a a, preferably cast solid therewith, exactly opposite each other, near its outer edge, which receive and travel in the circumferential groove b of the ball B, which latter is either cast solidly with its shaft B' or connected thereto in any suitable manner, as desired. The external periphery of the socket A is provided with a circumferential rabbet or shoulder, and the reduced portion $a^2$ thereof has exterior screw-threads to receive the ring C, which is correspondingly rabbeted or shouldered, and the reduced portion c of which has interior screw-threads, as shown, while the opposite edge of the said ring has a beveled face, c', inclined inwardly, so as not to be in the way of the shaft B'.

In putting my device together the ball is slipped into the socket, the groove b receiving the pins a a, and then the ring C is screwed to place, thus preventing any possibility of detachment, and yet permitting all necessary freedom of motion. If desired, the pins a a may be formed separately and screwed into the inner surface of the socket A, so as to be more readily replaced in case one or both of them should become broken.

Having thus described my invention, what I claim as new, and desire to secure by Letters Patent, is—

1. A universal joint consisting of a socket with inwardly-projecting pins, and a ball having a circumferential groove to receive said pins, and a ring adapted to screw over the end of the socket and prevent detachment of the parts, substantially as set forth.

2. The combination of the socket A, having inwardly-projecting pins a a and exterior reduced screw-threaded portion, $a^2$, ball B, having circumferential groove d, and ring C, having reduced interior screw-threaded portion, c, and inclined beveled face c', substantially as set forth.

In testimony that I claim the foregoing I have hereunto set my hand on this 20th day of March, 1883, in the presence of two witnesses.

ERNST W. VOGEL.

Witnesses:
H. G. UNDERWOOD,
M. KAUMHEIMER.